United States Patent
Pribble et al.

(10) Patent No.: US 9,565,642 B2
(45) Date of Patent: Feb. 7, 2017

(54) GAN AMPLIFIER FOR WIFI APPLICATIONS

(71) Applicant: Cree, Inc., Durham, NC (US)

(72) Inventors: William Pribble, Apex, NC (US); Simon Wood, Raleigh, NC (US); James W. Milligan, Cary, NC (US)

(73) Assignee: Cree, Inc., Durham, NC (US)

( * ) Notice: Subject to any disclaimer, the term of this patent is extended or adjusted under 35 U.S.C. 154(b) by 160 days.

(21) Appl. No.: 14/251,112

(22) Filed: Apr. 11, 2014

(65) Prior Publication Data

US 2015/0296461 A1   Oct. 15, 2015

(51) Int. Cl.
| | | |
|---|---|---|
| *H01Q 11/12* | (2006.01) | |
| *H04B 1/04* | (2006.01) | |
| *H04W 52/24* | (2009.01) | |
| *H04B 1/3805* | (2015.01) | |
| *H04B 17/10* | (2015.01) | |

(52) U.S. Cl.
CPC ......... *H04W 52/241* (2013.01); *H04B 1/0458* (2013.01); *H04B 1/3805* (2013.01); *H04B 17/102* (2015.01); *H04B 2001/0416* (2013.01)

(58) Field of Classification Search
CPC .............. H03F 3/20; H03F 3/21; H03F 3/211; H03F 3/213; H03F 3/24; H03F 3/245; H04W 52/241; H04B 17/102; H04B 1/0458; H04B 1/3805; H04B 2001/0416
USPC .......... 455/552.1, 561, 127.1, 127.4
See application file for complete search history.

(56) References Cited

U.S. PATENT DOCUMENTS

| | | | | |
|---|---|---|---|---|
| 7,508,267 | B1 * | 3/2009 | Yu | H03F 3/195 330/286 |
| 2006/0145761 | A1 | 7/2006 | Pribble et al. | |
| 2007/0018210 | A1 | 1/2007 | Sheppard | |
| 2012/0062335 | A1 * | 3/2012 | Sherrer | H01P 5/12 333/127 |
| 2012/0105147 | A1 * | 5/2012 | Harris | H03F 1/56 330/57 |
| 2012/0194276 | A1 | 8/2012 | Fisher | |
| 2013/0313694 | A1 * | 11/2013 | Yin | H01L 23/49527 257/666 |
| 2014/0183547 | A1 * | 7/2014 | Ikeda | H01L 29/94 257/76 |
| 2014/0292404 | A1 * | 10/2014 | Geng | H03F 1/3241 330/149 |

(Continued)

OTHER PUBLICATIONS

International Search Report and Written Opinion Corresponding to International Application No. PCT/US2015/025423; Date of Mailing: Sep. 21, 2015; 15 Pages.

(Continued)

*Primary Examiner* — Nguyen Vo
(74) *Attorney, Agent, or Firm* — Myers, Bigel, P.A.

(57) ABSTRACT

A gallium nitride (GaN) radio frequency integrated circuit (RFIC) is configured to receive and amplify a low-level WiFi signal to generate a WiFi transmit signal. By using a GaN RFIC, the performance of the RFIC is significantly improved when compared to conventional RFICs for WiFi signals. In one exemplary embodiment, the RFIC has an error vector magnitude less than 29 dBc, an average power output around 29 dBm, and an average power added efficiency of greater than 25%. In additional embodiments, the RFIC has a gain greater than about 32 dB and a peak output power around −37 dB.

35 Claims, 13 Drawing Sheets

(56) References Cited

U.S. PATENT DOCUMENTS

2015/0022270 A1* 1/2015 Outaleb ............... H03F 1/0288
    330/295
2015/0045047 A1* 2/2015 Picker .................. H04W 88/08
    455/450

OTHER PUBLICATIONS

Xing Zhou et al. "1 W, Highly Efficient, Ultra-Broadband Non-Uniform Distributed Power Amplifier in GaN", *IEEE Microwave and Wireless Components Letters*, vol. 23, No. 4, Apr. 1, 2013, pp. 208-210.

Author Unknown, "IEEE Standard for Information Technology—Telecommunications and information exchange between systems, Local and metropolitan area networks—Specific requirements, Part 11: Wireless LAN Medium Access Control (MAC) and Physical Layer (PHY) Specifications," IEEE Standard 802.11, Mar. 29, 2012, IEEE, 2793 pages.

\* cited by examiner

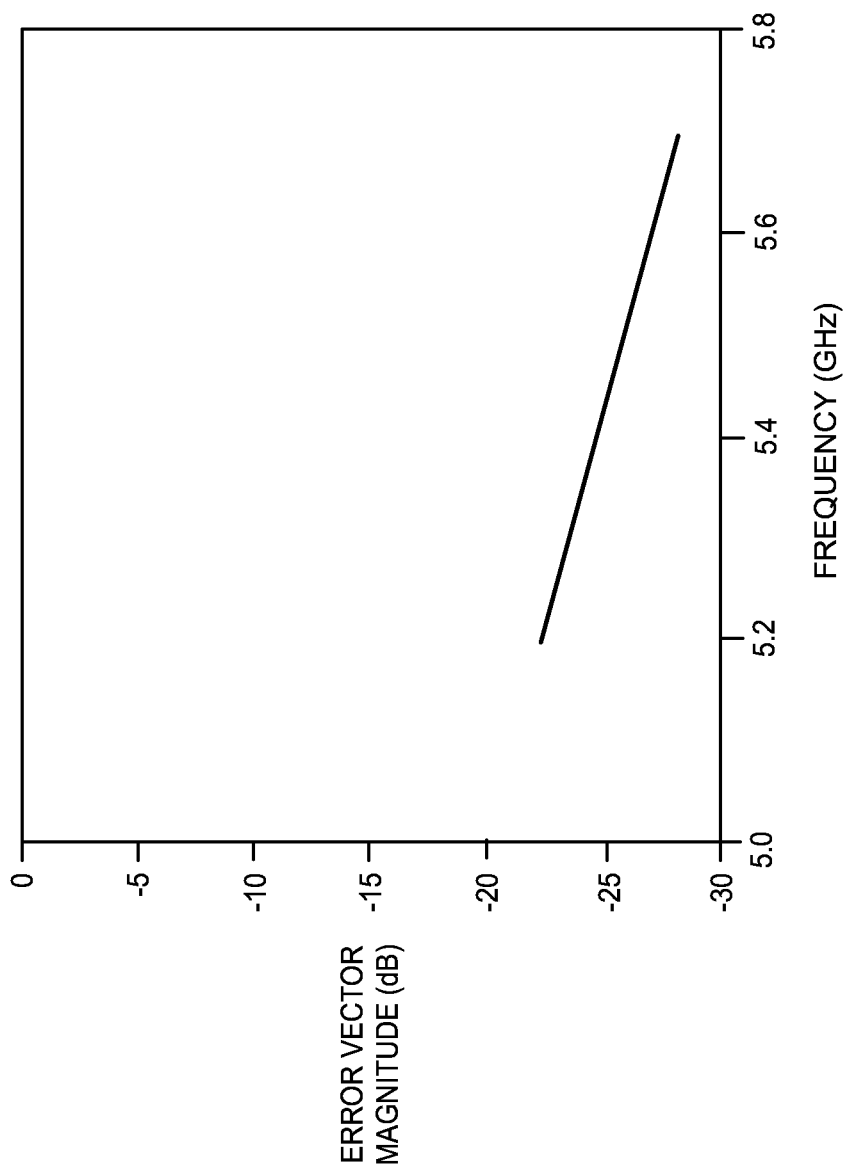

GAN AMPLIFIER FOR WIFI APPLICATIONS

FIELD OF THE DISCLOSURE

The present disclosure relates to Gallium Nitride (GaN) radio frequency integrated circuits (RFICs) and Monolithic Microwave Integrated Circuits (MMICs) for WiFi (Wireless Fidelity) applications.

BACKGROUND

WiFi (Wireless Fidelity) continues to be a preferred wireless networking standard for many homes, offices, and other relatively close-proximity environments. Over the years, WiFi standards have evolved to provide improvements in data throughput, reliability, and security. The evolving WiFi standards continue to demand increasing complexity from radio frequency integrated circuits (RFICs) used for transmission of WiFi signals. For example, IEEE 802.11ac, one of the latest iterations of the WiFi standard currently deployed, requires an RF integrated circuit (RFIC) capable of transmitting signals about a relatively wide bandwidth (up to 160 MHz), which places stringent requirements on the linearity of one or more RF power amplifiers (PAs) used in the RFIC.

Conventionally, Silicon (Si) or Gallium Arsenide (GaAs) RFICs have been preferred for the transmission of WiFi signals. Although these conventional RFICs have provided adequate performance when used with many previous iterations of the WiFi standard, they are not optimally suited for the latest generation of WiFi standards, such as IEEE 802.11ac. Using conventional RFICs for transmission of WiFi signals according to the latest standards may result in significant losses in the efficiency of the RFIC. Further, conventional RFICs are limited in their output power, thereby restricting the distance over which WiFi signals can be transmitted.

Current demand to expand WiFi coverage areas into large spaces and outdoor environments has prompted a need for RFICs for transmission of WiFi signals with greater output power. For example, in an attempt to fill coverage gaps in many cellular service networks and offload network resources, high-power WiFi transmitters may be used together with cellular access points to provide a continuous coverage area. In the future, 3GPP Long Term Evolution (LTE) "small cells" are expected to be deployed, which include a combination of LTE transmitters and WiFi transmitters to fill service coverage gaps in otherwise problematic areas. Accordingly, there is a need for an RFIC for the transmission of WiFi signals with an improved efficiency and output power.

SUMMARY

The present disclosure relates to radio frequency integrated circuits (RFICs) for WiFi (Wireless Fidelity) signals. According to one embodiment, a gallium nitride (GaN) RFIC is configured to receive and amplify a low-level WiFi signal to generate a WiFi transmit signal. Using a GaN RFIC to amplify WiFi signals significantly improves the performance of the RFIC when compared to conventional WiFi RFICs. In one exemplary embodiment, the RFIC has an error vector magnitude (EVM) around −30 dBc, an average power output around 29 dBm, and an average power added efficiency (PAE) greater than about 27%. In additional embodiments, the RFIC has a gain greater than about 34 dB and a peak output power around 37 dB.

According to one embodiment, a GaN RFIC for use in a WiFi transmitter includes one or more GaN transistors and impedance matching circuitry coupled in series with the one or more GaN transistors. The one or more GaN transistors may be configured to receive and amplify a low-level WiFi signal to generate a WiFi transmit signal. As discussed above, using a GaN RFIC to generate WiFi signals results in significant improvements in the performance of a device in which the GaN RFIC is incorporated.

According to one embodiment, a wireless access point comprises a processor, a first RFIC, and a second RFIC. The first RFIC is configured to receive low-level long term evolution (LTE) signals from the processor and generate an LTE transmit signal. The second RFIC is a GaN RFIC configured to receive and amplify a low-level WiFi signal from the processor to generate a WiFi transmit signal. As discussed above, using a GaN RFIC to generate WiFi signals results in significant improvements in the performance when compared to conventional WiFi RFICs. Further, including RFICs for generating both LTE and WiFi transmit signals in the wireless access point results in a robust connection to the wireless access point.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 9A-9E are graphs illustrating one or more performance advantages of the RFIC shown in FIG. 6 according to one embodiment of the present disclosure.

DETAILED DESCRIPTION

Figure 1:
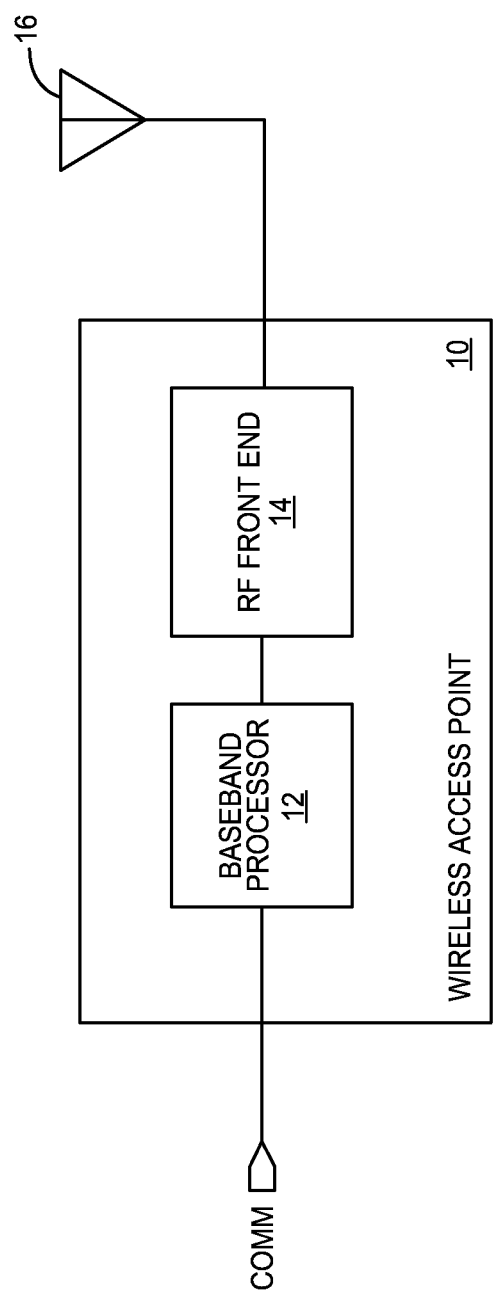
FIG. 1 shows a wireless access point according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Turning now to FIG. 1, a wireless access point 10 is shown according to one embodiment of the present disclosure. The wireless access point 10 includes a network communication interface (COMM), a baseband processor 12, RF front-end circuitry 14, and an antenna 16. The baseband processor 12 is coupled between the network communication interface (COMM) and the RF front-end circuitry 14, which is in turn coupled to the antenna 16. Generally, the wireless access point 10 provides a wireless interface to one or more network devices, which may use the wireless interface to communicate with other network devices connected to the wireless access point 10 via the wireless interface or the network communication interface (COMM). Accordingly, the baseband processor 12 may appropriately route and translate data between the network communication interface (COMM) and one or more network devices wirelessly connected to the wireless access point 10. To provide the wireless interface, the RF front-end circuitry 14 may receive baseband transmit signals from the baseband processor 12, modulate and amplify the baseband transmit signals in accordance with one or more wireless network protocol standards to generate one or more RF transmit signals, and transmit the RF transmit signals using the antenna 16. In other embodiments, modulation of the baseband signals may occur in the baseband processor 12 itself. Further, the RF front-end circuitry 14 may receive RF receive signals from the antenna 16, amplify and demodulate the RF receive signals to generate one or more baseband receive signals, and deliver the baseband receive signals to the baseband processor 12. The network communication interface (COMM) may connect the wireless access point 10 to a larger network, for example, the Internet, such that network devices connected to the wireless access point 10 via the wireless interface may access Internet resources.

Although a single antenna is shown associated with the wireless access point 10 in FIG. 1, those of ordinary skill in the art will appreciate that the principles of the present disclosure may be applied to wireless access points and other wireless devices including any number of antennas. Further, those of ordinary skill in the art will appreciate that the components illustrated in the wireless access point 10 shown in FIG. 1 are merely exemplary, and that a wireless access point or other wireless device may include more or less components without departing from the principles of the present disclosure.

In one embodiment, the wireless access point 10 is a WiFi (Wireless Fidelity) access point. Accordingly, the wireless signals transmitted and received by the wireless access point 10 may adhere to one or more of the IEEE 802.11 standards, for example, 802.11b, 802.11g, 802.11n, or 802.11ac, which are herein incorporated by reference in their entirety. In another embodiment, the wireless access point 10 is a 3GPP Long Term Evolution (LTE) "small cell" used to provide LTE coverage to a relatively small geographical area. In one exemplary embodiment, the wireless access point 10 may provide LTE signals over a geographical area less than about 0.1 km$^2$. Accordingly, the wireless signals transmitted and received by the wireless access point 10 may adhere to one or more of the 3GPP LTE standards, which are herein incorporated by reference in their entirety. In yet another embodiment, the wireless access point 10 is both a WiFi access point and an LTE "small cell", such that the wireless signals transmitted and received by the wireless access point 10 adhere to one or more WiFi standards and one or more of the 3GPP LTE standards.

Figure 2:
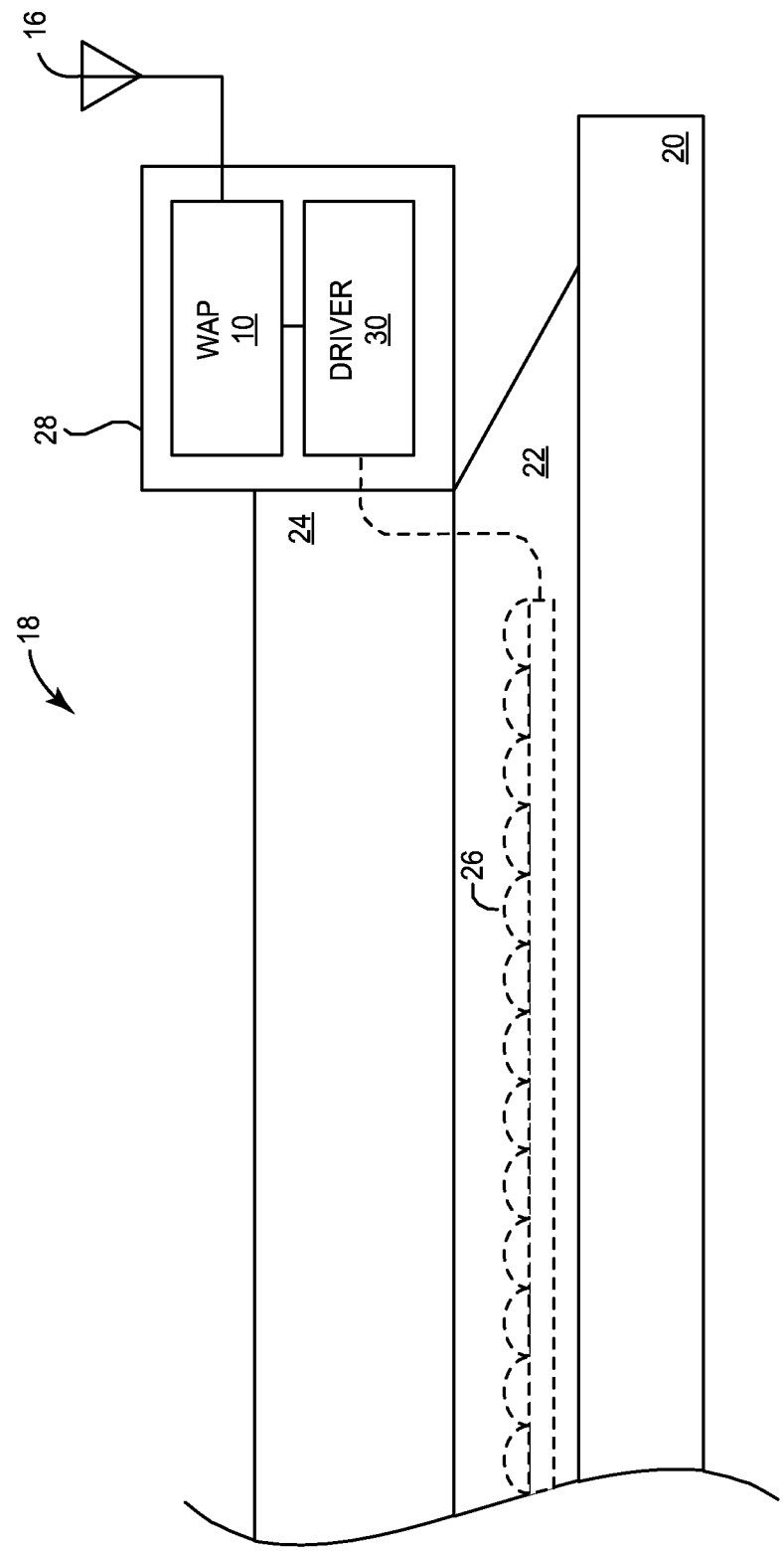
FIG. 2 shows a wireless access point according to an additional embodiment of the present disclosure.

FIG. 2 shows the wireless access point 10 according to an additional embodiment of the present disclosure wherein the wireless access point 10 is integrated into a lighting fixture 18. The lighting fixture may be an LED-based lighting fixture, such as a CS series troffer manufactured by Cree in Durham, N.C. The lighting fixture may include an outer frame 20, a reflector 22, a cover 24, an LED light source 26, an electronics housing 28, and a driver module 30. The outer frame 20 provides support for the reflector 22, which allows light generated from the LED light source 26 to reflect downwards towards a desired area. The cover 24 may support the reflector 22 and the outer frame 20. The driver module 30 may be located in the electronics housing 28 with the wireless access point 10. Further, the driver module 30 may provide power to the LED light source 26, and may interface with the wireless access point 10 in order to allow for wireless control of the LED light source 26. Providing the wireless access point in the lighting fixture 18 may allow for the reliable propagation of WiFi signals in a large indoor environment, while simultaneously providing a wireless interface for remote control of the lighting fixture 18.

Figure 3:
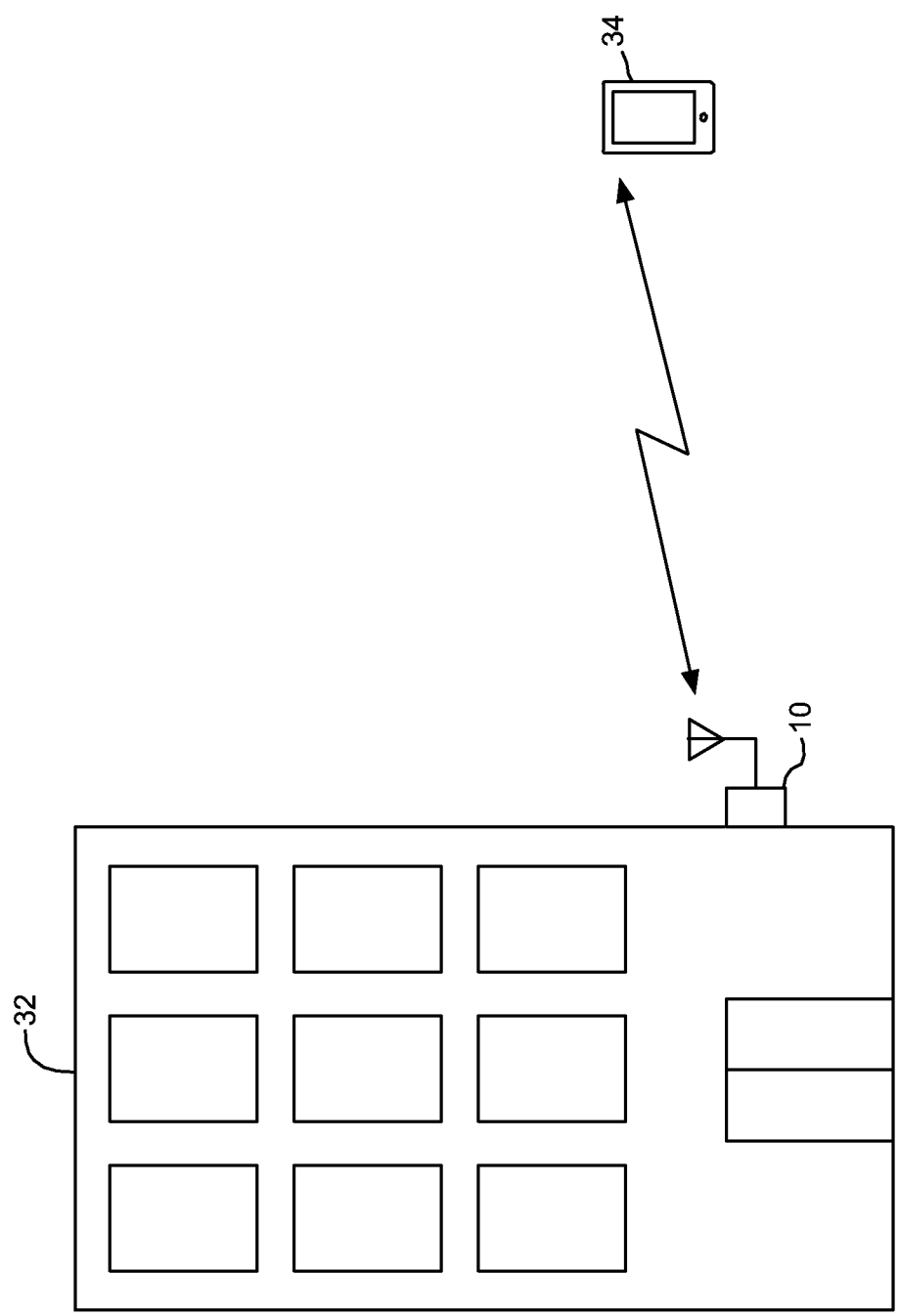
FIG. 3 shows an exemplary application of the wireless access point according to one embodiment of the present disclosure.

FIG. 3 shows an exemplary application of the wireless access point 10 wherein the wireless access point 10 is mounted on the side of a building 32. As discussed above, the wireless access point 10 may be provided in a geographical area wherein cellular coverage is weak or otherwise problematic. Often, large buildings in urban environments interfere with the propagation of wireless signals, thereby creating areas with poor or no cellular service. The wireless access point 10 may be provided in such an area, for example, on the side of a building, in order to fill one or more of these gaps in coverage. Accordingly, the wireless access point 10 may enable one or more wireless devices 34 located in an area with poor cellular service to communicate with one another, as well as with a larger network, for example, the Internet.

Figure 4:
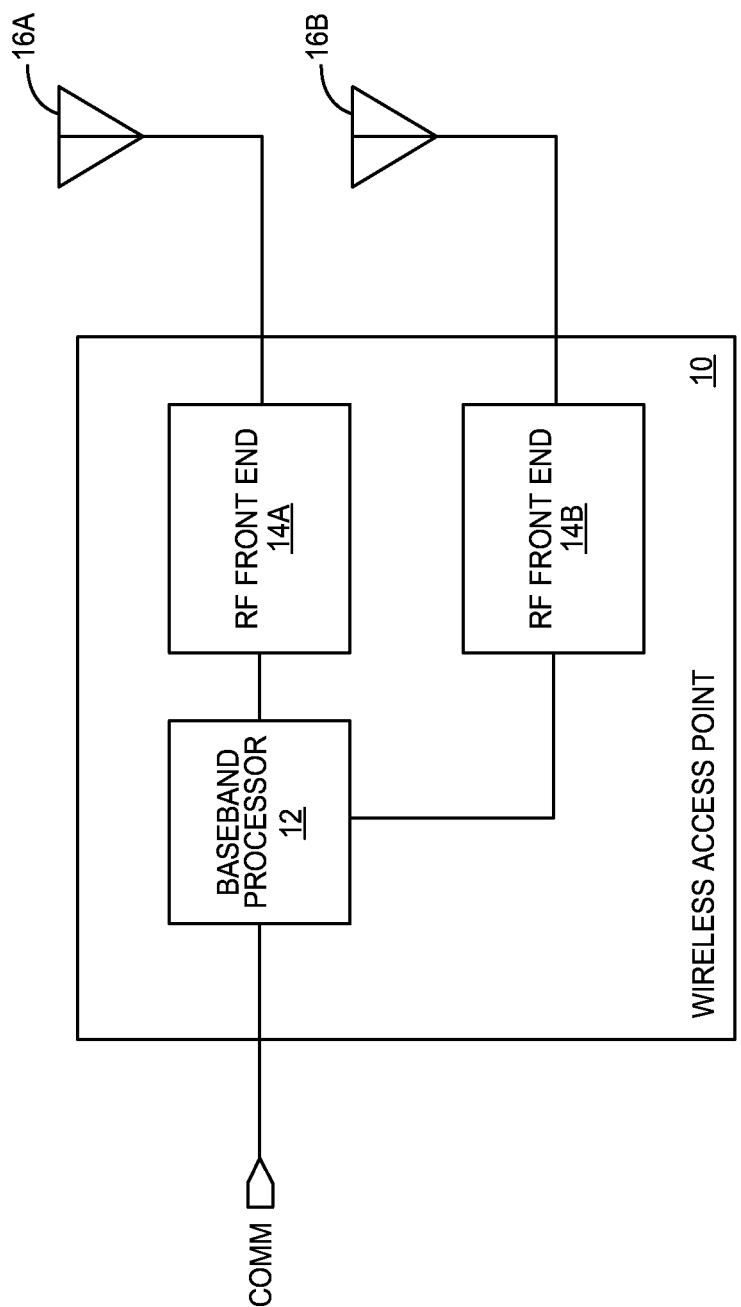
FIG. 4 shows a wireless access point according to an additional embodiment of the present disclosure.

FIG. 4 shows the wireless access point 10 according to an additional embodiment of the present disclosure wherein the wireless access point 10 is capable of functioning as both an LTE "small cell" and a WiFi access point. The wireless access point 10 shown in FIG. 4 is substantially similar to that shown in FIG. 1, but includes first RF front-end circuitry 14A associated with a first antenna 16A, and second RF front-end circuitry 14B associated with a second antenna 16B. The first RF front-end circuitry 14A may be configured to transmit and receive wireless signals about one or more of the 3GPP LTE standards over a relatively small geographical area. The second RF front-end circuitry 14B may be configured to transmit and receive WiFi signals adhering to one or more of the IEEE 802.11 standards. Accordingly, the wireless access point 10 shown in FIG. 4 is capable of transmitting and receiving both LTE and WiFi signals, which allows for a more robust connection mechanism to the wireless access point 10 and may further increase data rates of devices connected to the wireless access point 10.

Figure 5:
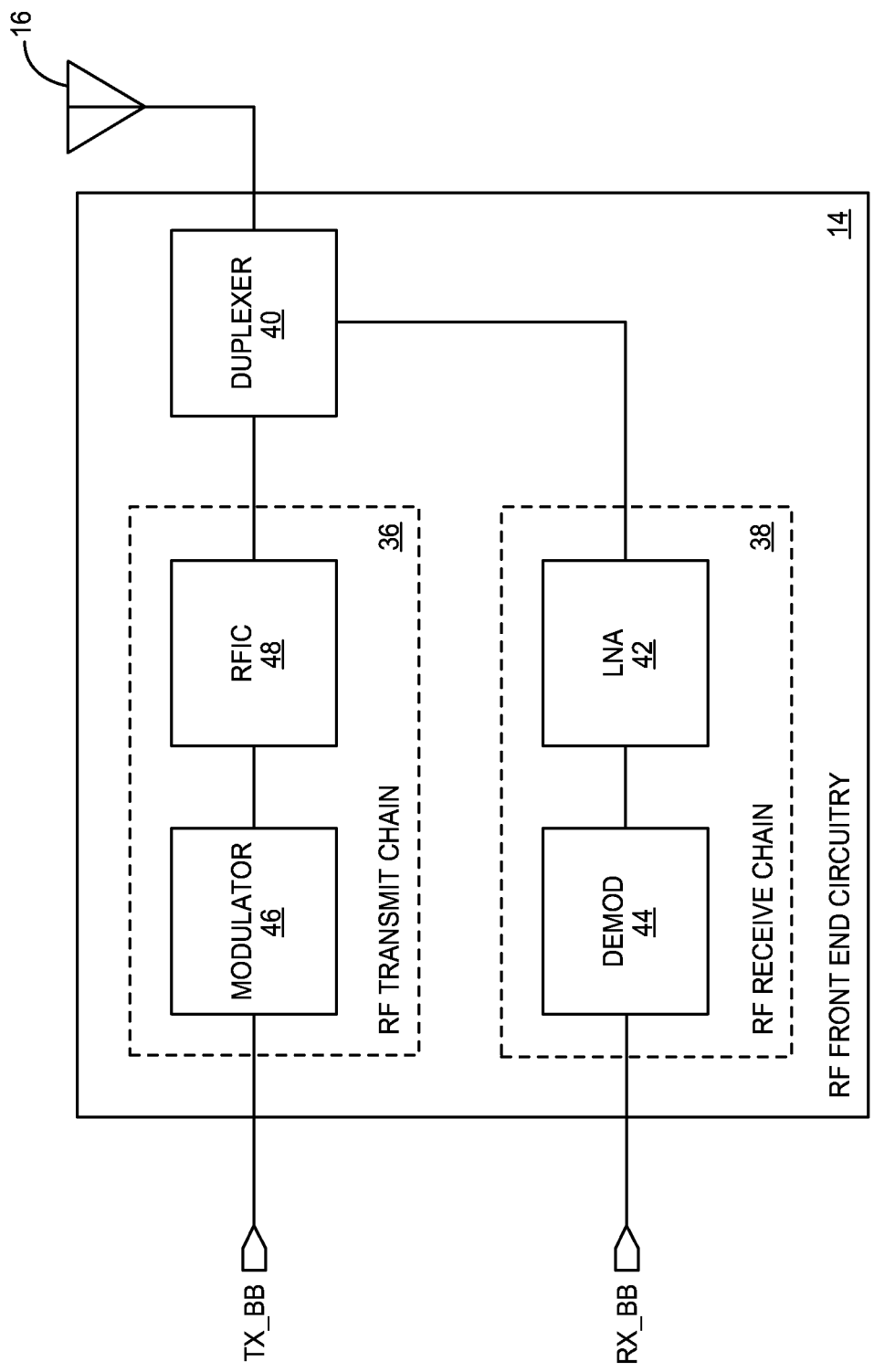
FIG. 5 shows details of the radio frequency (RF) front-end circuitry shown in the wireless access point of FIG. 1 according to one embodiment of the present disclosure.

FIG. 5 shows details of the RF front-end circuitry 14 according to one embodiment of the present disclosure. As shown in FIG. 5, the RF front-end circuitry 14 includes an RF transmit chain 36, an RF receive chain 38, and a duplexer 40. The RF transmit chain 36 is coupled between a baseband transmit (TX_BB) interface and the duplexer 40. The RF receive chain 38 is coupled between the duplexer 40 and a baseband receive (RX_BB) interface. The duplexer 40 is also coupled to the antenna 16. In operation, when an RF signal is received at the antenna 16, it is forwarded to the RF receive chain 38 via the duplexer 40. A low-noise amplifier 42 in the RF receive chain 38 amplifies the RF receive signal to an appropriate level, and delivers the amplified RF receive signal to a demodulator 44, where it is demodulated into a baseband receive signal and delivered to the baseband receive (RX_BB) interface. The baseband processor 10 can then route, translate, or otherwise process the baseband receive signal as necessary.

When a baseband transmit signal is received at the baseband transmit (TX_BB) interface, it is first sent to a modulator 46 in the RF transmit chain 36, where it is modulated according to a predetermined wireless communication protocol standard and delivered to an RF integrated circuit (RFIC) 48. In some embodiments, modulation of the baseband transmit signal occurs in the baseband processor 12 itself, and the resulting low-level RF signal is delivered directly to the RFIC 48. The RFIC 48 then amplifies the resulting low-level RF signal to generate an RF transmit signal, which is sent through the duplexer 40 to the antenna 16 for transmission.

As discussed above, it is desirable for the RFIC 48 to have a high efficiency and output power in order to reduce the power consumption of the RF transmit chain 36, while simultaneously being capable of transmitting RF signals from the antenna 16 over a greater distance. Accordingly, the RFIC 48 may be a gallium nitride (GaN) RFIC including one or more GaN power amplifiers (PAs) similar to part no. CHGV1F006F manufactured by Cree in Durham, N.C., the data sheet of which is herein incorporated by reference in its entirety. Using a GaN RFIC to transmit WiFi signals may result in significant performance improvements of the RF transmit chain 36, and further may allow for the transmission of WiFi signals over a greater distance. In one exemplary embodiment, the RFIC 48 is a GaN RFIC with a peak output power of about 37 dBm, a frequency band of about 5-6 GHz, a gain greater than about 34 dB, an error vector magnitude (EVM) less than about −30 dBc, an average power output of about 29 dBm, and an average power added efficiency (PAE) greater than about 27% when transmitting WiFi signals. In an additional embodiment, the GaN RFIC enables the wireless access point 10 to transmit signals at speeds greater than 1 Gbps.

Figure 6:
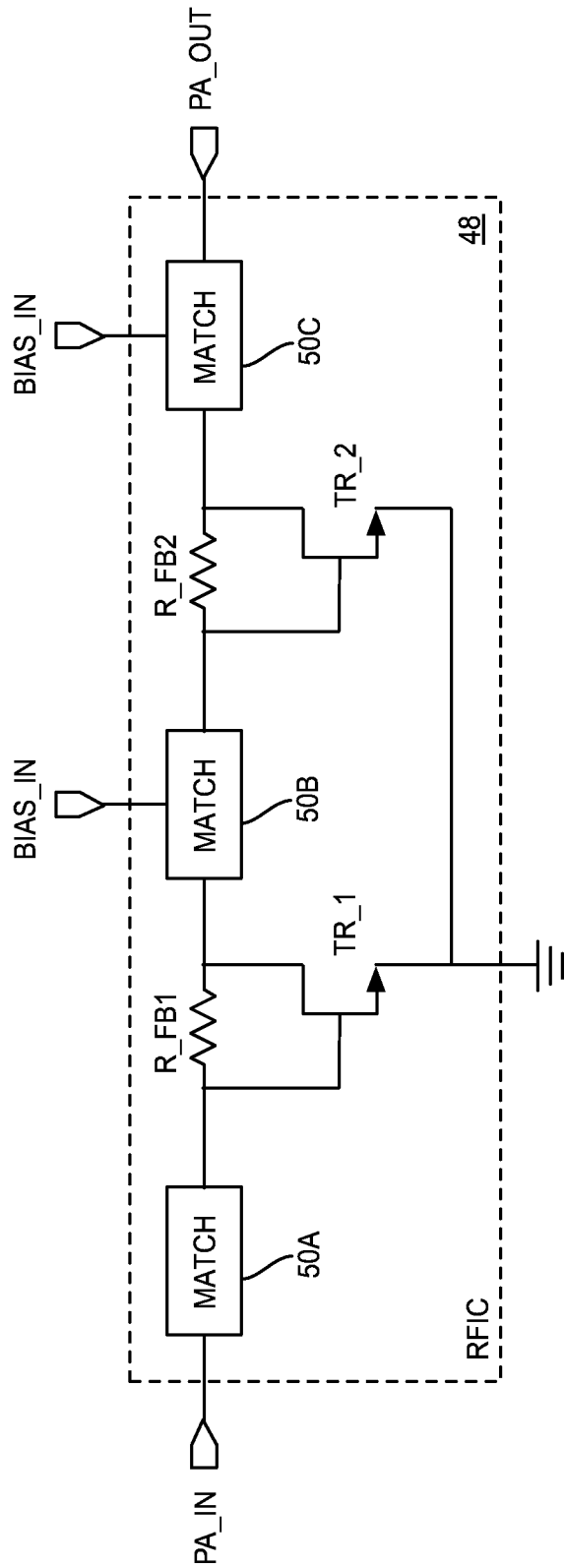
FIG. 6 shows details of a radio frequency (RF) power amplifier (PA) in the RF front-end circuitry shown in FIG. 2 according to one embodiment of the present disclosure.

FIG. 6 shows details of the RFIC 48 according to one embodiment of the present disclosure. As shown in FIG. 6, the RFIC 48 includes a first transistor TR_1, a second transistor TR_2, an input impedance matching network 50A, an intermediate impedance matching network 50B, an output impedance matching network 50C, a first feedback resistor R_FB1, and a second feedback resistor R_FB2. The input impedance matching network 50A is coupled between a power amplifier input interface (PA_IN) and the gate contact of the first transistor TR_1. The first feedback resistor R_FB1 is coupled between the gate contact and the drain contact of the first transistor TR_1. The intermediate impedance matching network 50B is coupled between the drain contact of the first transistor TR_1 and the gate contact of the second transistor TR_2. The second feedback resistor R_FB2 is coupled between the gate contact and the drain contact of the second transistor TR_2. The output impedance matching network 50C is coupled between the source contact of the second transistor TR_2 and a power amplifier output interface (PA_OUT). The source contacts of the first transistor TR_1 and the second transistor TR_2 are each coupled to ground.

Each one of the impedance matching networks 50 may be configured to match the impedance presented to each side of the impedance matching network 50. Further, one or more of the impedance matching networks 50 may be configured to receive a bias voltage from an external source (not shown) at a bias input interface (BIAS_IN), and deliver the bias voltage to either the first transistor TR_1 or the second transistor TR_2.

As discussed above, the RFIC 48 may be a GaN RFIC. Specifically, the RFIC 48 may be monolithically integrated on a single GaN semiconductor die. In one embodiment, the first transistor TR_1 and the second transistor TR_2 are GaN high electron mobility transistors (HEMTs), however, those of ordinary skill in the art will appreciate that the first transistor TR_1 and the second transistor TR_2 may be fabricated using any suitable transistor structure. For example, the first transistor TR_1 and the second transistor TR_2 may be field-effect transistors (FETs), metal-oxide-semiconductor field-effect transistors (MOSFETs), bipolar junction transistors (BJTs), or the like. As discussed above, using a GaN monolithic semiconductor structure for the RFIC 48 results in improvements in efficiency and output power of the RFIC 48 compared to conventional WiFi transmitters.

In additional embodiments, the RFIC 48 may include additional circuitry such as power detection circuitry and/or gain control circuitry, which is monolithically integrated with the RFIC 48.

Figure 7:
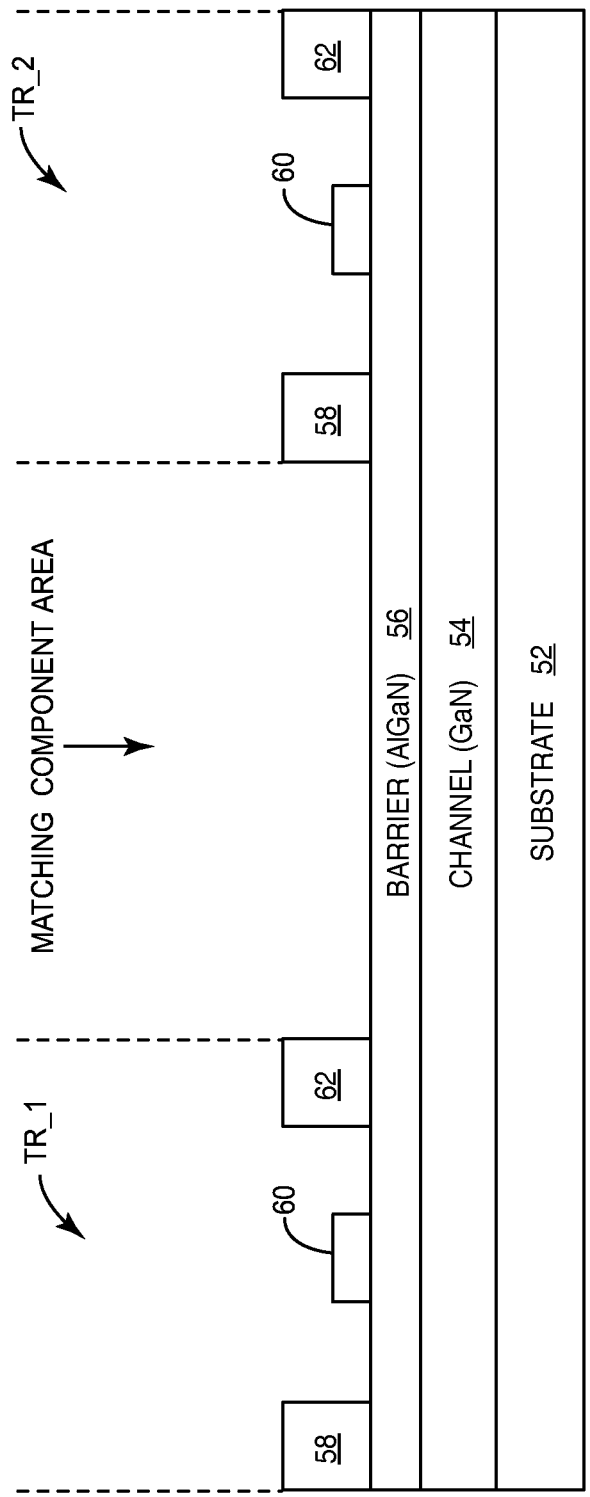
FIG. 7 is a two-dimensional representation illustrating an exemplary semiconductor die structure of the RFIC shown in FIG. 3 according to one embodiment of the present disclosure.

FIG. 7 shows a two-dimensional cross-section of the RFIC 48 semiconductor die according to one embodiment of the present disclosure. As shown in FIG. 7, the first transistor TR_1 and the second transistor TR_2 are GaN HEMTs, which are monolithically integrated with the impedance matching networks 50. Specifically, the RFIC 48 semiconductor die includes a substrate 52, a channel layer 54 over the substrate 52, and a barrier layer 56 over the channel layer 54. In one embodiment, the channel layer 54 is GaN, the barrier layer 56 is aluminum gallium nitride (AlGaN), and the substrate 52 is silicon carbide (SiC). Each one of the first transistor TR_1 and the second transistor TR_2 may include a source contact 58 on the surface of the barrier layer 56 opposite the channel layer 54, a gate contact 60 adjacent to the source contact 58, and a drain contact 62 adjacent to the gate contact 60, such that the source contact 58, the gate contact 60, and the drain contact 62 are laterally separated from one another on the surface of the barrier layer 56. Although not shown, each one of the impedance matching networks 50 may be formed in the substrate 52, the channel layer 54, the barrier layer 56, or some combination thereof, or on the surface of the barrier layer 56. In one embodiment, the first feedback resistor R_FB1 and the second feedback resistor R_FB2 are also monolithically integrated with the first transistor TR_1 and the second transistor TR_2.

In one embodiment, the RFIC 48 semiconductor die is about 1.5 mm long by 0.87 mm wide for a total die area around 1.3 mm². Those of ordinary skill in the art will appreciate that the two-dimensional cross-section shown in FIG. 7 is merely illustrative. That is, the RFIC 48 semiconductor die may be configured in many different ways, all of which are contemplated herein.

Figure 8:
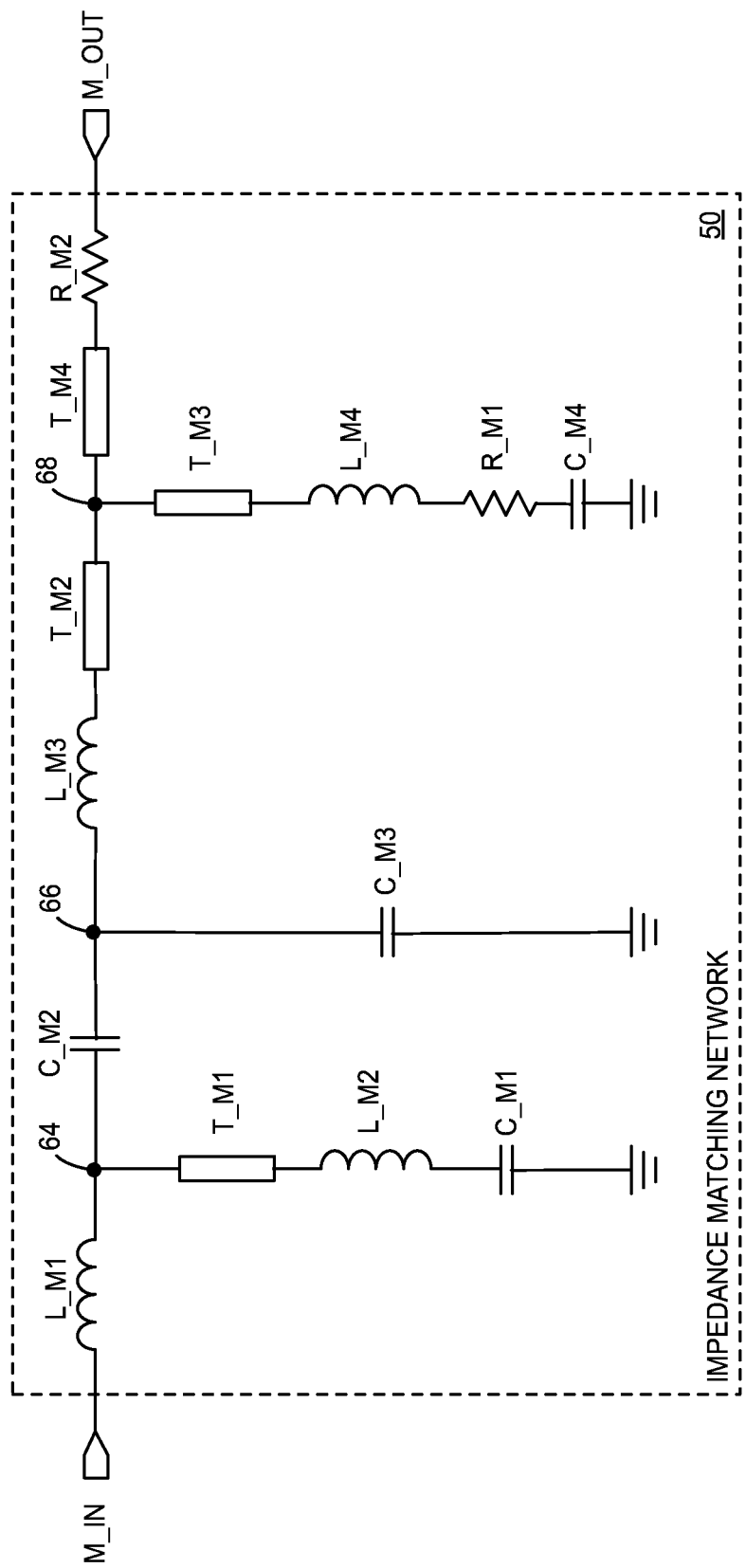
FIG. 8 shows details of the one or more matching networks shown in FIG. 6 according to one embodiment of the present disclosure.

FIG. 8 shows details of the impedance matching networks 50 according to one embodiment of the present disclosure. As shown in FIG. 8, each one of the impedance matching networks 50 includes an impedance matching input interface (M_IN), an impedance matching output interface (M_OUT), and a number of matching components. Specifically, a first matching inductor L_M1 is coupled between the impedance matching input interface (M_IN) and a first node 64. A first matching transmission line T_M1, a second matching inductor L_M2, and a first matching capacitor C_M1 are coupled in series between the first node 64 and ground. A second matching capacitor C_M2 is coupled between the first node 64 and a second node 66. A third matching capacitor C_M3 is coupled between the second node 66 and ground. A third matching inductor L_M3 and a second matching transmission line T_M2 are coupled in series between the second node 66 and a third node 68. A third matching transmission line T_M3, a fourth matching inductor L_M4, a first matching resistor R_M1, and a fourth matching capacitor C_M4 are coupled in series between the third node 68 and ground. Finally, a fourth matching transmission line T_M4 and a second matching resistor R_M2 are coupled in series between the third node 68 and the impedance matching output interface (M_OUT).

As will be appreciated by those of ordinary skill in the art, each one of the impedance matching networks effectively matches an impedance placed at the impedance matching input interface (M_IN) with an impedance presented at the impedance matching output interface (M_OUT). Further, those of ordinary skill in the art will appreciate that the number of matching components shown in FIG. 8 and their particular arrangement is merely illustrative. That is, the number of matching components and their particular arrangement may be adjusted based on the particular application of the impedance matching network without departing from the principles disclosed herein.

Figure 9A:
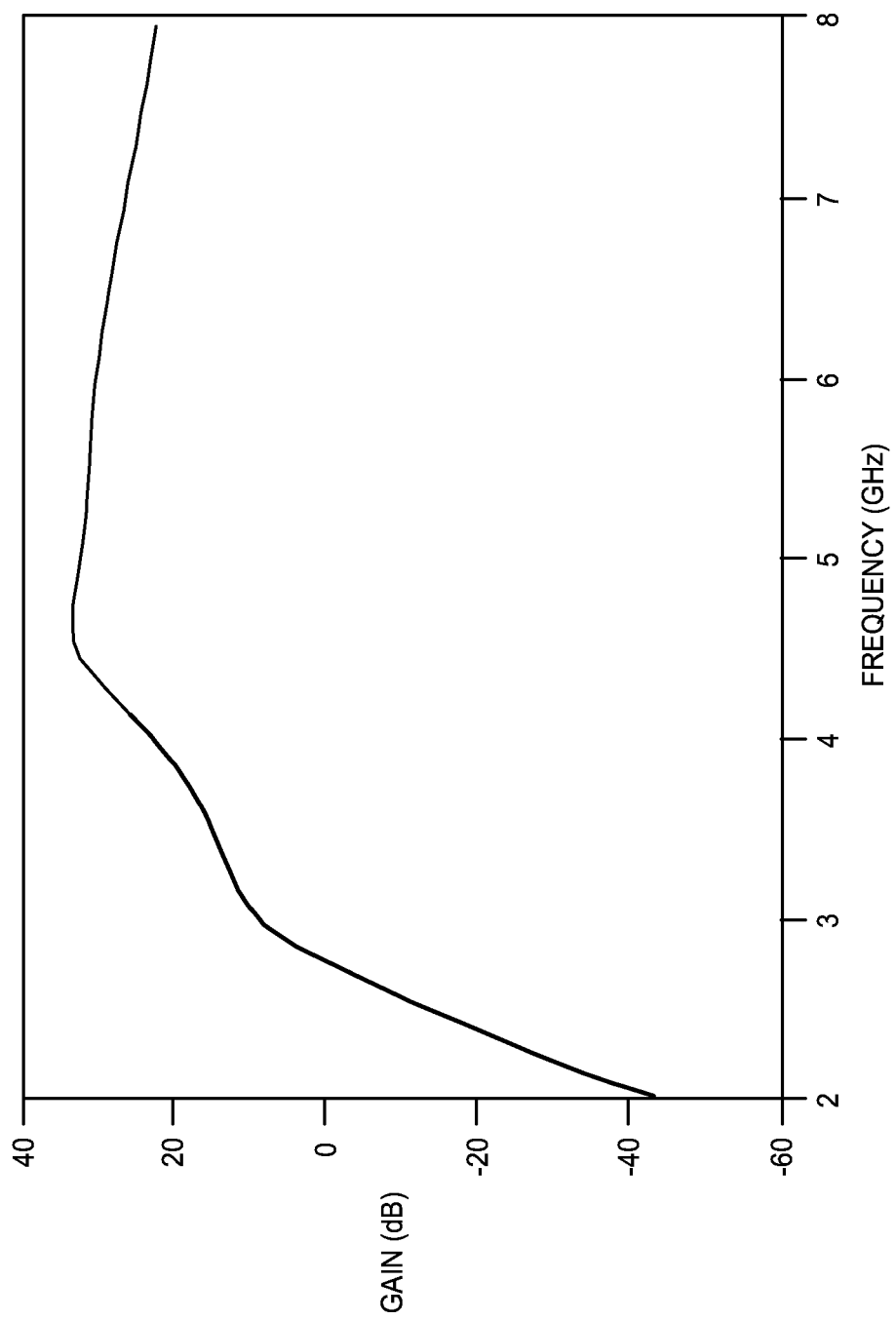
Figure 9B:
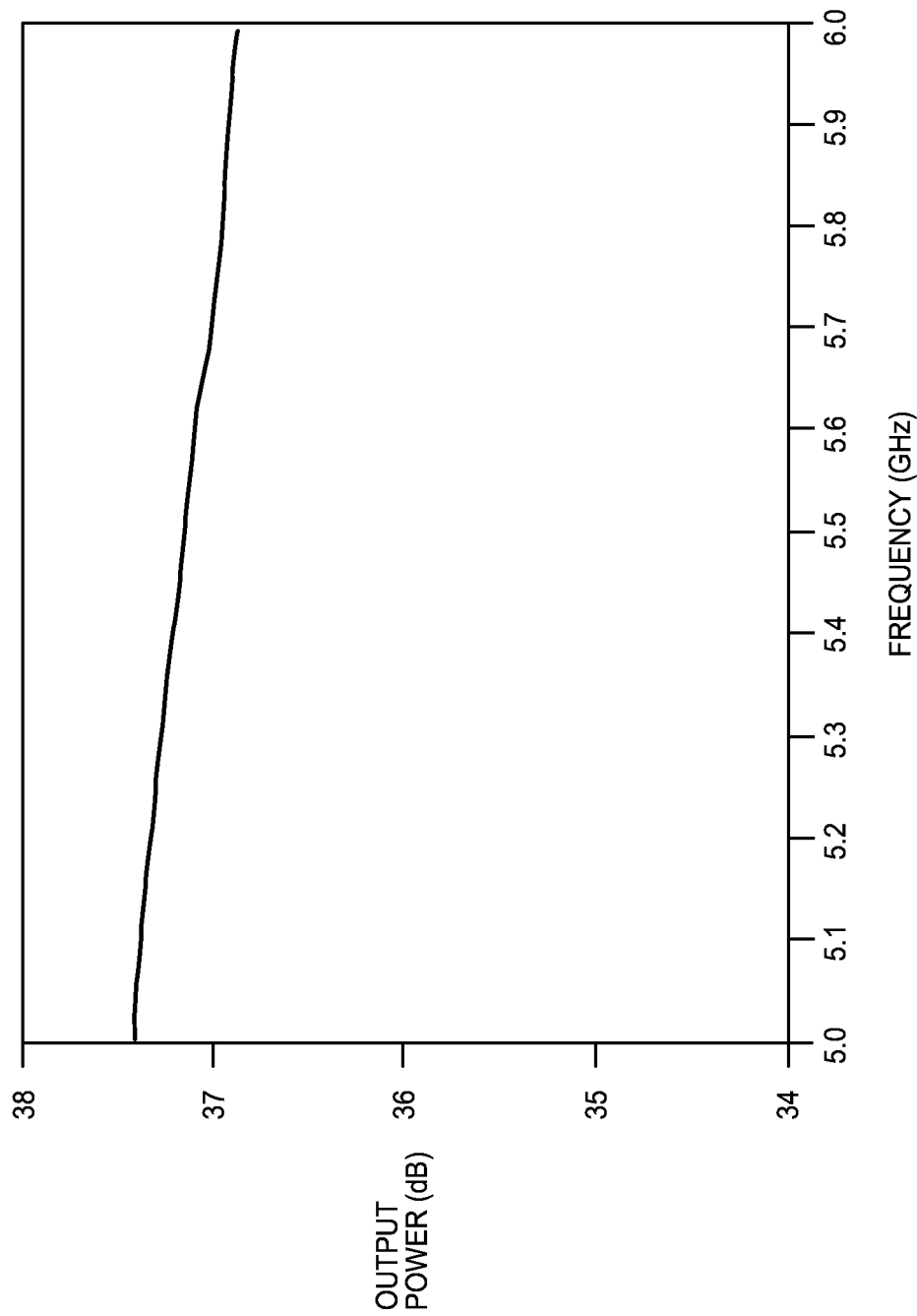

FIG. 9A is a graph illustrating the gain vs. frequency of the GaN RFIC 48 according to one embodiment of the present disclosure. As shown in FIG. 9A, the peak gain of the RFIC 48 occurs between 5 GHz and 6 GHz, which is the band specified for transmission of signals according to the IEEE 802.11ac standard, and is greater than about 32 dB. Similarly, FIG. 9B is a graph illustrating the output power vs. frequency of the RFIC 48 according to one embodiment of the present disclosure. As shown in FIG. 9B, the peak output power of the RFIC 48 also occurs between 5 GHz and 6 GHz, and is about 37 dBm or 5 watts. The relatively large gain and peak output power of the RFIC 48 may allow for transmission of WiFi signals over a greater distance while consuming less power. Accordingly, the RFIC 48 may experience significant performance improvements when compared to conventional RFICs used for the transmission of WiFi signals.

Figure 9C:
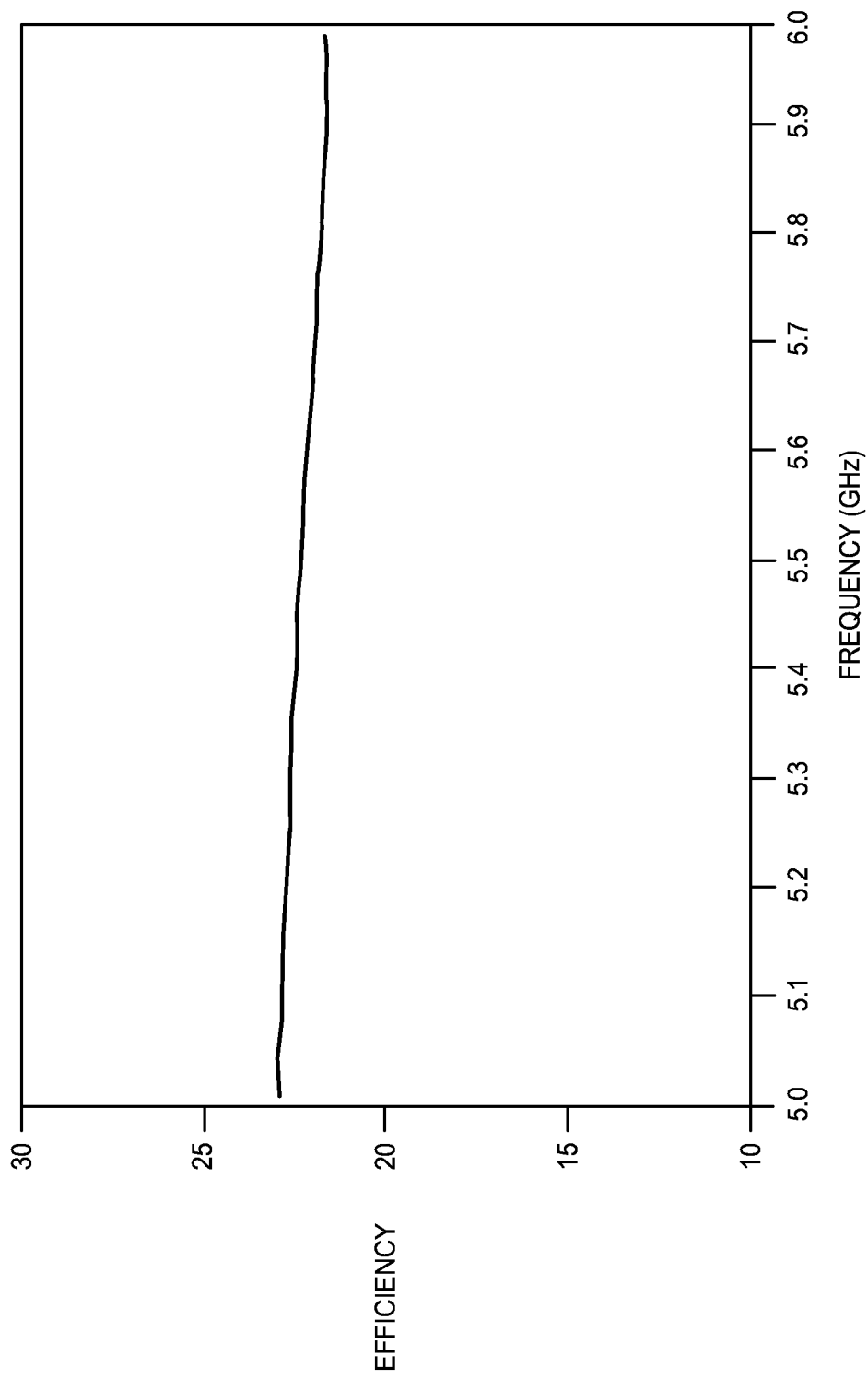

FIG. 9C is a graph illustrating the efficiency of the RFIC 48 operating at the 8 dB backoff power (29 dBm). As shown in FIG. 9C, the efficiency of the RFIC 48 at the 8 dB backoff power is around 23%, which is a significant improvement over conventional RFICs used for the transmission of WiFi signals. Accordingly, the RFIC 48 may produce less heat than conventional RFICs used for the transmission of WiFi signals, thereby allowing a designer greater flexibility in the design of a wireless access point incorporating the RFIC 48.

Figure 9D:
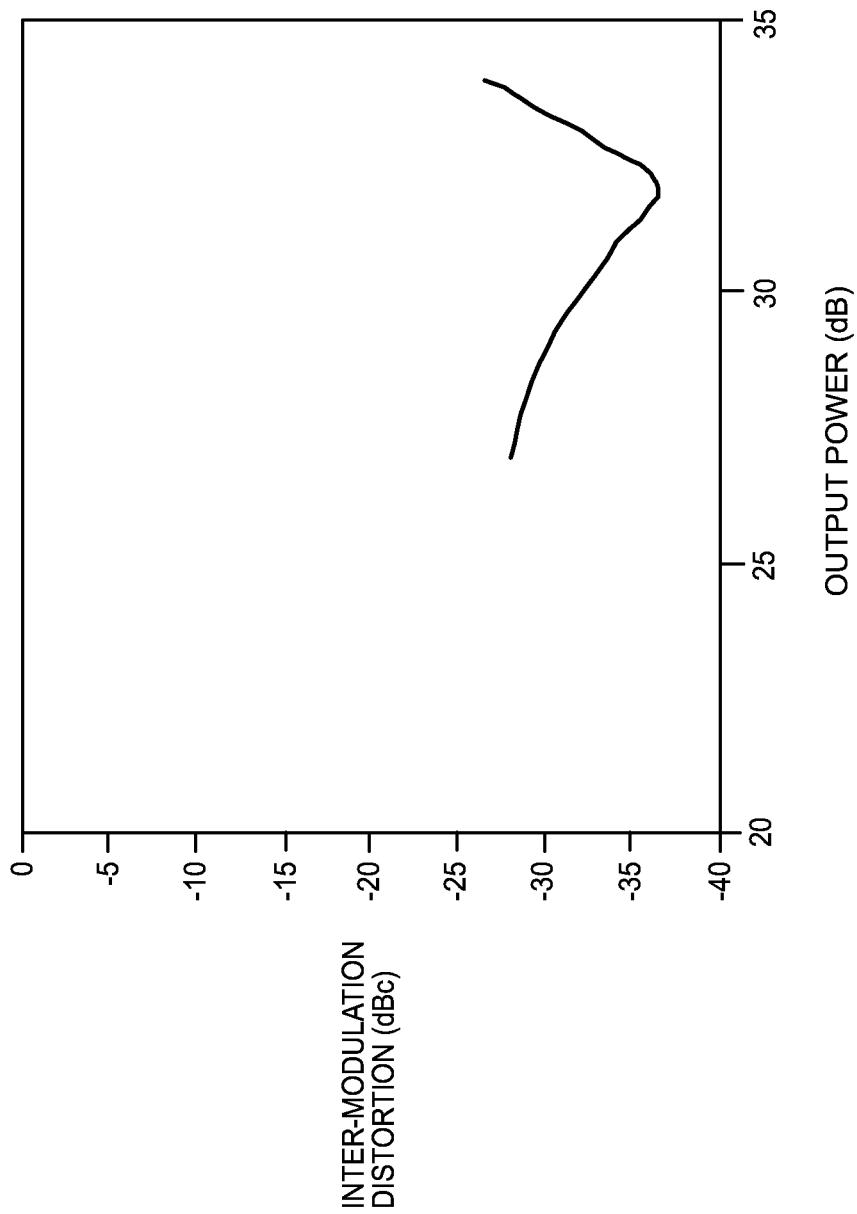

9D is a graph illustrating the inter-modulation distortion of the RFIC 48 operating around 5.7 GHz according to one embodiment of the present disclosure. As shown in FIG. 9D, the RFIC 48 experiences low levels of inter-modulation distortion (around −37 dB) when transmitting at this frequency. Accordingly, the RFIC 48 may experience improved linearity compared to conventional RFICs used for the transmission of WiFi signals.

FIG. 9E is a graph illustrating the error vector magnitude of the RFIC 48 when operated between 5 GHz and 6 GHz. As shown in FIG. 9E, the RFIC 48 provides a low error vector magnitude, which decreases as the frequency of operating increases. Additional simulations for GaN RFICs used for WiFi indicate that the error vector magnitude may be further decreased throughout the 5 GHz to 6 GHz spectrum. Accordingly, the RFIC 48 may experience improved performance when compared to conventional RFICs used for the transmission of WiFi signals.

Those skilled in the art will recognize improvements and modifications to the preferred embodiments of the present disclosure. All such improvements and modifications are considered within the scope of the concepts disclosed herein and the claims that follow.

What is claimed is:

1. A gallium nitride (GaN) RF integrated circuit (RFIC), the RFIC comprising:
 a monolithic semiconductor structure that comprises a first GaN transistor and a second GaN transistor; and
 impedance matching circuitry,
 wherein the first GaN transistor comprises a contact that is coupled to an input of the impedance matching circuitry and the second GaN transistor comprises a contact that is coupled to an output of the impedance matching circuitry,
 wherein the RFIC is configured to receive and amplify a low-level WiFi signal and to generate a WiFi transmit signal, and
 wherein the monolithic semiconductor structure comprises a GaN channel layer on a substrate and an AlGaN barrier layer on the GaN channel layer, and a plurality of regions corresponding to first and second GaN transistors and the impedance matching circuitry.

2. The RFIC of claim 1 wherein the RFIC has an error vector magnitude less than about −30 dBc, an average power output around 29 dBm, and an average power added efficiency greater than about 27%.

3. The RFIC of claim 2 wherein the RFIC has a gain greater than about 34 dB.

4. The RFIC of claim 3 wherein the RFIC has a peak output power around 37 dBm.

5. The RFIC of claim 1 wherein the RFIC has a die size less than about 1.5 mm by about 0.9 mm.

6. The RFIC of claim 1 wherein the first and second GaN transistors are high electron mobility transistors (HEMTs).

7. The RFIC of claim 1 wherein the WiFi transmit signal is an IEEE 802.11ac WiFi signal.

8. The RFIC of claim 1 wherein the RFIC comprises one or more of a group comprising power detector circuitry and gain control circuitry.

9. The RFIC of claim 1 wherein the RFIC is capable of transmitting signals at a speed greater than 1 Gbps.

10. The RFIC of claim 1, wherein the monolithic semiconductor structure comprises:
 a first region corresponding to the first GaN transistor;
 a second region corresponding to the second GaN transistor; and
 a matching component area that corresponds to impedance matching circuitry and that is between the first region and the second region.

11. The RFIC of claim 10, further comprising:
 first and second source contacts corresponding to respective first and second GaN transistors in the first and second regions, respectively;
 first and second drain contacts corresponding to respective first and second GaN transistors in the first and second regions, respectively; and
 first and second gate contacts corresponding to respective first and second GaN transistors in the first and second regions, respectively.

12. A gallium nitride (GaN) radio frequency integrated circuit (RFIC) for use in a WiFi transmitter comprising:
 a first GaN transistor that is coupled to a power amplifier input interface of the WiFi transmitter;
 a second GaN transistor that is coupled to a power amplifier output interface of the WiFi transmitter; and
 impedance matching circuitry coupled in series with and between the first and second GaN transistors.

13. The RFIC of claim 12 wherein the RFIC has an error vector magnitude less than about −30 dBc, an average power output around 29 dBm, and an average power added efficiency of greater than about 27%.

14. The RFIC of claim 13 wherein the RFIC has a gain greater than about 32 dB.

15. The RFIC of claim 14 wherein the RFIC has a peak output power around 37 dBm.

16. The RFIC of claim 12 wherein the RFIC is a monolithic semiconductor structure.

17. The RFIC of claim 16 wherein the monolithic semiconductor structure is built on a silicon carbide (SiC) substrate.

18. The RFIC of claim 16 wherein the RFIC has a die size less than about 1.5 mm by 0.9 mm.

19. The RFIC of claim 12 wherein the first and second GaN transistors are high electron mobility transistors (HEMTs).

20. The RFIC of claim 12 wherein the WiFi transmitter transmits IEEE 802.11ac WiFi signals.

21. The RFIC of claim 12 further comprising one or more of a group comprising power detector circuitry and gain control circuitry.

22. The RFIC of claim 12 wherein the RFIC is capable of transmitting signals at a speed greater than 1 Gbps.

23. A wireless access point comprising:
 a baseband processor;
 a first radio frequency integrated circuit (RFIC) configured to receive and amplify a low-level long term evolution (LTE) signal from the baseband processor to generate an LTE transmit signal; and
 a second gallium nitride (GaN) RFIC configured to receive and amplify a low-level WiFi signal from the baseband processor to generate a WiFi transmit signal,
 wherein the second GaN RFIC comprises:
 a first GaN transistor that is coupled to a power amplifier input interface of a WiFi transmitter;
 a second GaN transistor that is coupled to a power amplifier output interface of the WiFi transmitter; and
 a first impedance matching circuit that is coupled between a contact of the first GaN transistor and a contact of the second GaN transistor.

24. The wireless access point of claim 23 wherein the second RFIC has an error vector magnitude less than about −30 dBc, an average power output around 29 dBm, and an average power added efficiency greater than about 27%.

25. The wireless access point of claim 24 wherein the second RFIC has a gain greater than about 34 dB.

26. The wireless access point of claim 25 wherein the second RFIC has a peak output power around 37 dB.

27. The wireless access point of claim 23 wherein the second RFIC comprises impedance matching circuitry coupled in series with the first and second GaN transistors.

28. The wireless access point of claim 27 wherein the second RFIC is a monolithic semiconductor structure.

29. The wireless access point of claim 28 wherein the monolithic semiconductor structure is built on a silicon carbide (SiC) substrate.

30. The wireless access point of claim 28 wherein the second RFIC has a die size less than about 1.5 mm by 0.9 mm.

31. The wireless access point of claim 27 wherein the first and second GaN transistors are high electron mobility transistors (HEMTs).

32. The wireless access point of claim 23 wherein the WiFi transmit signal is an IEEE 802.11 ac WiFi signal.

33. The wireless access point of claim 23 wherein the second RFIC comprises one or more of a group comprising power detector circuitry and gain control circuitry.

34. The wireless access point of claim 23 wherein the wireless access point is capable of transmitting signals at a speed greater than 1 Gbps.

35. The wireless access point of claim 23, further comprising:
   a second impedance matching circuit that is between the first GaN transistor and the power amplifier input interface of the WiFi transmitter; and
   a third impedance matching circuit that is between the second GaN transistor and the power amplifier output interface of the WiFi transmitter.

* * * * *